(12) United States Patent
Godeau et al.

(10) Patent No.: US 12,130,409 B2
(45) Date of Patent: Oct. 29, 2024

(54) OPTICAL SYSTEM AND METHOD FOR REPAIRING AN OPTICAL LENS OF AN OPTICAL SYSTEM

(71) Applicant: ESSILOR INTERNATIONAL, Charenton-le-pont (FR)

(72) Inventors: Muriel Godeau, Charenton-le-pont (FR); Mathieu Feuillade, Charenton-le-pont (FR)

(73) Assignee: Essilor International, Charenton-le-Pont (FR)

( * ) Notice: Subject to any disclaimer, the term of this patent is extended or adjusted under 35 U.S.C. 154(b) by 557 days.

(21) Appl. No.: 17/429,848

(22) PCT Filed: Feb. 10, 2020

(86) PCT No.: PCT/EP2020/053368
§ 371 (c)(1),
(2) Date: Aug. 10, 2021

(87) PCT Pub. No.: WO2020/165107
PCT Pub. Date: Aug. 20, 2020

(65) Prior Publication Data
US 2022/0107445 A1    Apr. 7, 2022

(30) Foreign Application Priority Data
Feb. 11, 2019  (EP) .................................... 19305165

(51) Int. Cl.
*G02B 1/14* (2015.01)
*G02C 7/02* (2006.01)
(Continued)

(52) U.S. Cl.
CPC ................ *G02B 1/14* (2015.01); *G02C 11/10* (2013.01); *H05B 3/84* (2013.01); *H05B 2203/013* (2013.01)

(58) Field of Classification Search
None
See application file for complete search history.

(56) References Cited

U.S. PATENT DOCUMENTS 9,016,858 B2 * 4/2015 Zheng .................... G02B 1/041
351/159.57
10,295,821 B2 * 5/2019 McCabe ................ G02C 11/08
(Continued)

FOREIGN PATENT DOCUMENTS

CN     103348268     10/2013
CN     103534618     1/2014
(Continued)

OTHER PUBLICATIONS

Search Report issued in Corresponding Chinese Application No. 202080012295.8, dated Nov. 3, 2022.
(Continued)

*Primary Examiner* — Darryl J Collins
(74) *Attorney, Agent, or Firm* — Norton Rose Fulbright US LLP

(57) ABSTRACT

An optical system comprising an optical lens •—the optical lens comprising a substrate (2) and a self-healing coating (3) extending along at least part of a surface of the substrate, the self-healing coating having a glass-transition temperature equal to or greater than 40° C. and equal to or smaller than 60° C., and •—the optical system comprising a heating component (4) adapted to heat the self-healing coating at a temperature above the glass-transition temperature of the self-healing coating.

10 Claims, 4 Drawing Sheets

(51) Int. Cl.
*G02C 11/00* (2006.01)
*H05B 3/84* (2006.01)

(56) References Cited

U.S. PATENT DOCUMENTS

| | | | | |
|---|---|---|---|---|
| 10,822,504 | B2* | 11/2020 | Zheng | C09D 7/61 |
| 2011/0003159 | A1* | 1/2011 | Mather | B32B 27/40 |
| | | | | 428/425.6 |
| 2012/0235900 | A1* | 9/2012 | Border | G06F 3/017 |
| | | | | 345/156 |
| 2014/0036223 | A1* | 2/2014 | Zheng | G02B 1/105 |
| | | | | 264/2.6 |
| 2015/0286073 | A1* | 10/2015 | Blum | G02C 7/101 |
| | | | | 359/241 |
| 2016/0195643 | A1 | 7/2016 | Zheng | |
| 2016/0223718 | A1* | 8/2016 | Zheng | G02B 1/14 |
| 2016/0320621 | A1* | 11/2016 | Biteau | G02C 11/10 |
| 2017/0255029 | A1* | 9/2017 | Klosinski, Jr. | G02C 5/22 |
| 2020/0040184 | A1* | 2/2020 | El-Said | C08K 3/041 |

FOREIGN PATENT DOCUMENTS

| | | |
|---|---|---|
| CN | 105122094 | 12/2015 |
| CN | 205193381 | 4/2016 |
| CN | 207867062 | 9/2018 |
| CN | 109310894 | 2/2019 |
| EP | 3290965 | 3/2018 |
| WO | WO 2012/105974 | 8/2012 |
| WO | WO 2012/177239 | 12/2012 |
| WO | WO 2014/071179 | 5/2014 |
| WO | WO 2015/033182 | 3/2015 |
| WO | WO2017223438 | 12/2017 |

OTHER PUBLICATIONS

International Search Report and Written Opinion issued in Corresponding PCT Application No. PCT/EP2020/053368, dated May 20, 2020.

Office Action issued in Corresponding Chinese Application No. 202080012295.8, dated Nov. 3, 2022 (English Translation provided).

Office Action issued in related European Application No. 20704291.2, dated Apr. 30, 2024, 4 pages.

* cited by examiner

OPTICAL SYSTEM AND METHOD FOR REPAIRING AN OPTICAL LENS OF AN OPTICAL SYSTEM

CROSS-REFERENCE TO RELATED APPLICATIONS

This application is a national phase application under 35 U.S.C. § 371 of International Application No. PCT/EP2020/053368 filed 10 Feb. 2020, which claims priority to European Patent Application No. 19305165.3 filed 11 Feb. 2019. The entire contents of each of the above-referenced disclosures is specifically incorporated by reference herein without disclaimer.

FIELD OF THE INVENTION

The invention relates to optical systems and to methods for repairing an optical lens of an optical system of the invention.

BACKGROUND OF THE INVENTION

The development of optical elements, including optical lenses, manufactured from plastic materials has also required the development of protective coatings providing good abrasion resistance and/or scratch resistance.

In the optical field there is still considerable endeavor and research for improving the known hard-coatings to make them ever more abrasion and scratch resistant.

A rather new and very interesting route for solving the problem of scratches and/or abrasion of organic glasses is to protect the lenses with coating layers able to repair themselves, i.e. coatings which would be able, when submitted to a simple physical treatment, to revert completely or partially to the initial non-scratched condition.

Coatings known in the art, which are either a polystyrene base resin or a two-part epoxy-based resin, show interesting self-healing performances. Preliminary experimental tests carried out by the inventors have however shown that these coatings suffer either from excessive initial haze and/or from very poor scratch resistance.

Therefore, there is a need for an optical system comprising an optical lens with good self-healing properties and a good initial scratch resistance and for a method for repairing an optical lens of such optical system.

One object of the present invention is to provide such optical systems and methods.

SUMMARY OF THE INVENTION

To this end, the invention proposes an optical system comprising an optical lens,
  the optical lens comprising a substrate and a self-healing coating extending along at least part of a surface of the substrate, the self-healing coating having a glass-transition temperature equal to or greater than 40° C. and equal to or smaller than 60° C., and
  the optical system comprising a heating component adapted to heat the self-healing coating at a temperature above the glass-transition temperature of the self-healing coating.

Advantageously, the self-healing coating has a good initial scratch resistance thanks to the glass-transition temperature being sufficiently greater than the ambient temperature.

Advantageously, the self-healing properties of the self-healing coating may be activated thanks to the heating component. As a result, the system of the invention allows repairing an optical lens in a very simple manner.

According to embodiments, the method according to the invention may further comprise one or several of the following features according to any possible combination:
  the optical system further comprises a spectacle frame; and/or
  said optical lens is mounted on the spectacle frame; and/or
  the heating component is arranged in the optical lens; and/or
  the heating component is arranged in-between the substrate and the self-healing coating; and/or
  the heating component comprises a resistive layer and a pair of electrodes adapted to apply a current to the resistive layer so that the resistive layer heats up by Joule effect; and/or
  the heating component is arranged in the spectacle frame; and/or
  the heating component comprises a resistive material adapted to transfer heat by thermal conduction to the self-healing coating and a pair of electrodes adapted to apply a current to the resistive material so that the resistive material heats up by Joule effect; and/or
  the optical system further comprises an impact sensor adapted to sense an impact on the optical lens; and/or
  the optical system further comprises activating means for activating the heating component; and/or
  the optical system further comprises a temperature sensor arranged to measure the temperature of the self-healing coating; and/or
  the optical system further comprises controlling means for controlling the heating component.

The invention further proposes a method for repairing an optical lens of an optical system according to the invention, the method comprising:
  using the heating component to heat the self-healing coating at a temperature above the glass-transition temperature of the self-healing coating.

The self-healing coating may comprise a material among polyurethanes, epoxies, and shape-memory (co)polymers. The self-healing coating may more specifically be a polythiol-ene matrix obtained by curing a liquid monomer mixture comprising at least one polyfunctional thiol and at least one polyfunctional allyl monomer.

In an embodiment the self-healing coating may be composed of resin materials such as the Norland Optical Adhesives (NOA) marketed by Norland Products Inc. When tested as protective coatings on ophthalmic lenses, these resins showed an interesting healing level.

In an embodiment, the self-healing coating may comprise conductive colloids such as $Sb_2O_5$ or $SnO_2$ into a thiol-ene resin. The incorporation of the conductive colloids increased significantly the healing level of the elf-healing coating. The amount of conductive colloids is preferably in the range of 0.5 to 7% by weight.

In an embodiment, the self-healing coating may comprise more than one polymer. The self-healing coating may comprise in addition of a polythiol-ene matrix and minor amount of another oligomer or polymer component, said component being either covalently bound to the polythiol-ene matrix or homogeneously incorporated therein. This additional oligomer or polymer component must be sufficiently compatible with both of the liquid monomer mixture and the cured resin to prevent any phase separation during or after the curing procedure which would inevitably lead to excessive haze of the final coating. The amount of the additional oligomer or polymer component in the polymer matrix preferably is not higher than about 30% by weight, preferably not higher than 20% by weight, and most preferably not higher than 10% by weight. The amount of the additional oligomer or polymer component in the polymer matrix preferably is not smaller than about 0.5% by weight Advantageously, thanks to using the heating component, the self-healing properties of the self-healing coating are activated.

BRIEF DESCRIPTION OF THE DRAWINGS

For a more complete understanding of the description provided herein and the advantages thereof, reference is now made to the brief descriptions below, taken in connection with the accompanying drawings and detailed description, wherein like reference numerals represent like parts.

DETAILED DESCRIPTION OF THE INVENTION

In the description which follows the figures are not necessarily to scale and certain features may be shown in generalized or schematic form in the interest of clarity and conciseness or for informational purposes.

In addition, although making and using various embodiments are discussed in detail below, it should be appreciated that as described herein are provided many inventive concepts that may be embodied in a wide variety of contexts. Embodiments discussed herein are merely representative and do not limit the scope of the invention. It will also be obvious to one skilled in the art that all the technical features that are defined relative to a process can be transposed, individually or in combination, to a device and conversely, all the technical features relative to a device can be transposed, individually or in combination, to a process.

As shown on FIGS. 1 to 7, an object of the invention is an optical system comprising an optical lens 1.

Figure 8:
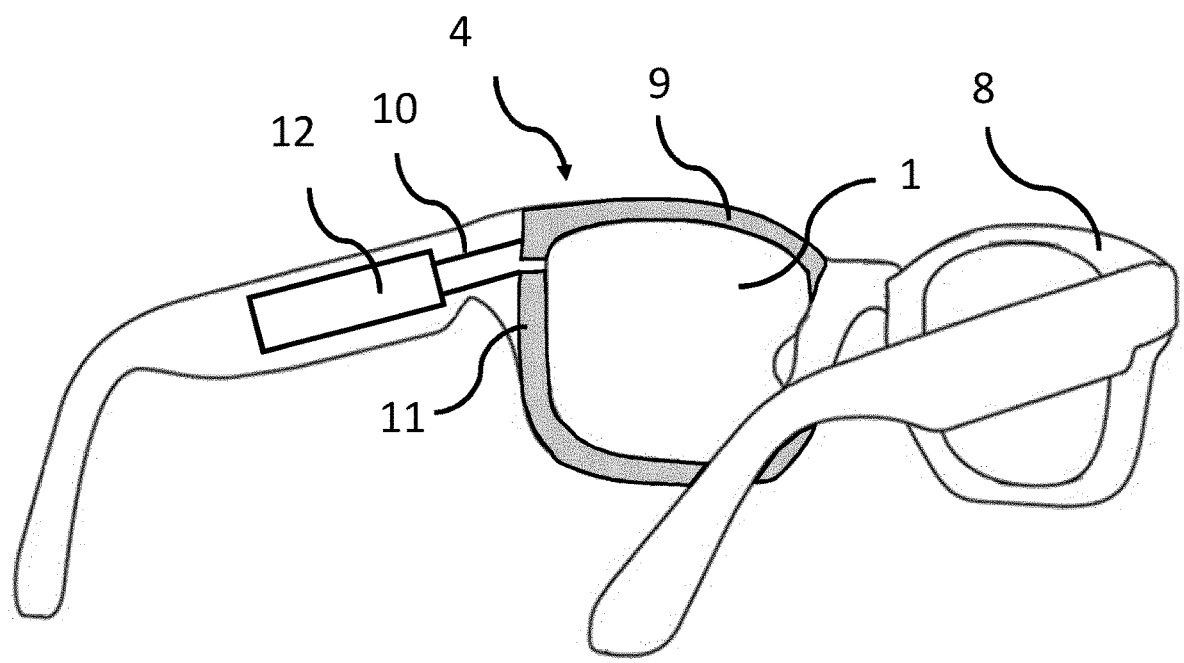
FIG. 8 depicts an optical system according to an embodiment of the invention.

As shown on FIG. 8, the optical system may further comprise a spectacle frame 8. In embodiments, the optical lens 1 may be mounted on the spectacle frame 8.

The optical system is suitable for use with a wide variety of eyewear, including but not limited to ski goggles, prescription goggle lenses, tactical goggles, head-mounted display, sun glasses, corrective prescription glasses, diving goggles, protective industrial eyewear such as safety glasses, firefighting protective eyewear, welding shields, helmet visors (e.g., for football, hockey, or motorcycle helmets), and paintball masks. While primarily intended for eyewear, the optical system can be utilized with other types of lenses such as the lenses of professional grade cameras or video cameras. The optical system may be semi-customized or universally fitted to fit a particular type of eyewear; for example, an optical system according to an embodiment of the invention is shaped to fit within the frame of a ski goggle without obscuring the vents of the goggle, while an optical system according to another embodiment of the invention is configured to cover a major portion of the surface of the face shield of a helmet.

The optical system may comprise a passive wave guide and/or a passive holographic mirror and/or an electro-active element such as a liquid crystal cell, an electro-active wave guide, an electro-active holographic mirror.

As illustrated on FIGS. 1 to 7, the optical lens 1 comprises a substrate 2.

The substrate 2 may be made of a transparent material, for example transparent material adapted for ophthalmic lenses, including but not limited to thermoplastic materials with a glass-transition temperature above 100° C., such as polycarbonate, thermosetting resins, such as CR39®.

The substrate 2 has two opposed surfaces: a front surface and a rear surface, the rear surface being the surface intended to be the closest to the wearer's eye when the optical lens is placed before a wearer's eye.

At least one of the opposed surfaces is finished. In the sense of the invention, a finished surface is a surface having a finished optical state i.e. having a desired curvature and no more surfacing or polishing treatment is needed. At this stage, some additional coatings (primer coatings, self-healing coatings, hydrophobic and/or oleophobic coatings, anti-fog coatings) might however be applied on this surface.

In embodiments, both opposed surfaces are finished. Alternatively, one of the opposed surfaces may be finished while the other opposed surface does not have a desired curvature, i.e. is not surfaced.

As particular embodiments, lenses having finished optical state may be obtained
   by surfacing and polishing a lens blank,
   directly by casting the lenses in a mold whose optical mold parts have a finished state,
   directly by injection molding under pressure (case of thermoplastic polymer) in a mold whose optical mold parts have a finished state, The optical lens 1 may have one or more of the following properties: a dioptric function, for example adapted to the prescription of a wearer, a light absorption function for example adapted to a sunlens, a blue cut function and/or UV protection function, a polarization function, photochromic properties. The optical lens 1 may be a plano lens, for example a plano sunlens. Each of the properties above may be provided by the substrate 2, or by at least one specific layer extending along the front or the rear surface of the substrate 2, or by a combination of the substrate 2 and at least one specific layer.

As shown on FIGS. 1 to 7, the optical lens 1 comprises a self-healing coating 3.

The self-healing coating 3 extends along at least part of a surface of the substrate 2. As shown on FIGS. 1 and 2, the self-healing coating 3 may be disposed directly on a surface of the substrate 2. In embodiments, the self-healing coating may be glued on a surface of the substrate 2. In embodiments, the self-healing coating may be applied on a surface of the substrate 2 through a vacuum deposition such a sputtering method or a physical evaporation under vacuum or a spin coating method or a dip coating method. The dip coating method allows to apply the self healing coating on both faces of the substrate at the same time.

In embodiments, the self-healing coating 3 has a thickness less than 4 µm, for example less than 3 µm, such as less than 2 µm. Advantageously, the thickness and weight of the self-healing coating 3 is negligible over the total thickness and weight of the optical system. Advantageously, minimizing the thickness of the self-healing coating 3 contributes in minimizing haze on the optical lens 1.

In embodiments, the self-healing coating 3 has a thickness greater than 0.1 µm, for example greater than 0.2 µm, such as greater than 0.4 µm. Advantageously, the weight of the self-healing coating 3 is minimized while maintaining a sufficient thickness to repair by creeping.

In embodiments, the self-healing coating 3 extends along at least part of the front surface of the substrate 2. Indeed, when the optical lens 1 is placed before a wearer's eye, the front surface of the optical lens 1 is more subject to scratches.

In embodiments, the self-healing coating extends along at least part of the rear surface of the substrate 2. Indeed, scratches may form accidentally on the rear surface of an optical lens for example in case of scrubbing with a rough cloth.

The self-healing coating 3 has a glass-transition temperature equal to or greater than 40° C. In embodiments, the glass-transition temperature is equal to or greater than 45° C. The self-healing coating 3 has a glass-transition temperature equal to or smaller than 60° C. In embodiments, the glass-transition temperature is equal to or smaller than 55° C.

Advantageously, the self-healing coating 3 has a good initial scratch resistance thanks to having a glass-transition temperature equal to or greater than 40° C., that is, sufficiently greater than the ambient temperature for most applications.

Advantageously, the self-healing properties may be activated by heating the self-healing coating 3 above its glass-transition temperature without damaging the substrate 2 thanks to the self-healing coating 3 having a glass-transition temperature equal to or smaller than 60° C.

In embodiments, the self-healing coating 3 is made of a transparent material.

In embodiments, the self-healing coating 3 has one or more of the following properties: an anti-static function, an anti-fouling function, an anti-fog function, a reflection function, for example antireflective properties, a light absorption function, for example blue cut and/or UV protection, a specific color, a polarization function, an optical lens edges protection function and photochromic properties. The optical lens edges protection function may include a protection of the optical lens 1 against shocks, impacts or abrasions. The optical lens edges protection function may include sealing the edge of the optical lens 1 with respect to the external environment, such as moisture, solvents, oxygen, and the like.

Figure 2:
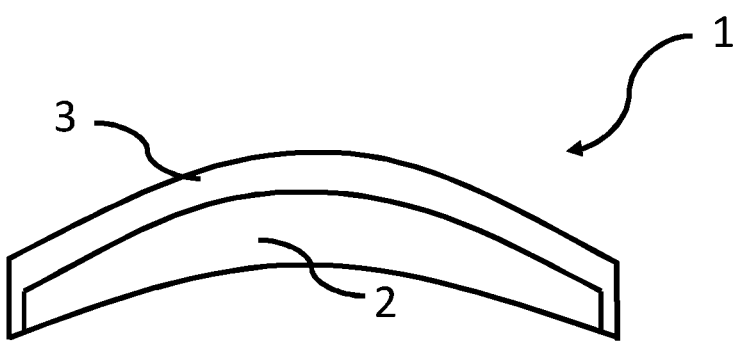

As illustrated on FIG. 2, the self-healing coating 3 may extend over the edges of the optical lens 1 so as to protect the edges of the optical lens 1. In particular, the self-healing coating 3 may extend over the edges of the optical lens 1, forming a compressible buffer region between the optical lens 1 and a spectacle frame element of a spectacle frame. A specific intermediate seal may be inserted between the edges of the optical lens 1 and the part of the self-healing coating 3 extending over said edges.

The optical system comprises a heating component 4 adapted to heat the self-healing coating 3 at a temperature above the glass-transition temperature of the self-healing coating 3. The heating component 4 may transfer heat to the self-healing coating 3 by thermal conduction, and/or by thermal radiation.

Advantageously, the self-healing properties of the self-healing coating 3 may be activated thanks to the heating component 4. Indeed, the self-healing coating 3 is made of a viscoelastic material. In other words, above its glass-transition temperature, the self-healing coating creeps under its own weight, which effectively removes any scratch or abrasion initially present at the surface of the self-healing coating 3.

In embodiments, the optical system may comprise a plurality of self-healing coatings 3. For example, an optical system may comprise two optical lenses 1, each optical lens 1 comprising a self-healing coating 3. An optical system may also comprise an optical lens 1 which comprises a substrate 2, a first self-healing coating 3 extending along the front surface of the substrate 2 and a second self-healing coating 3 extending along the rear surface of the substrate 2. In such embodiments, the optical system may comprise a single common heating component 4 for all self-healing coatings. Alternately, the optical system may comprise as many heating components 4 as self-healing coatings 3. It is also possible that a heating component 4 comprises some means, which will be described later, common to all self-healing coatings 3 and some means specific to each self-healing coating 3.

As illustrated on FIGS. 3 to 7 the heating component may be arranged in the optical lens 1. In other words, the heating component 4 may form part of the optical lens 1.

Figure 3:
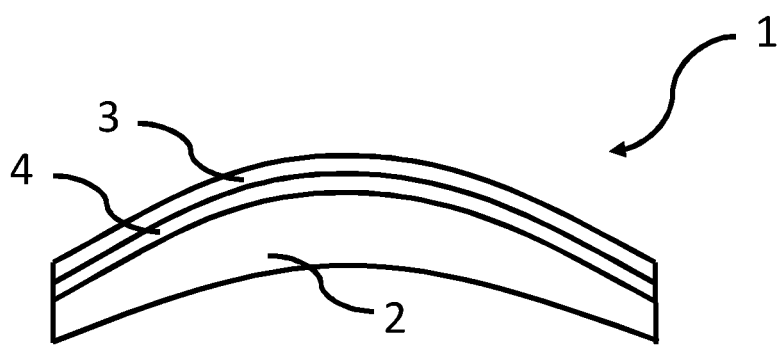
Figure 4:
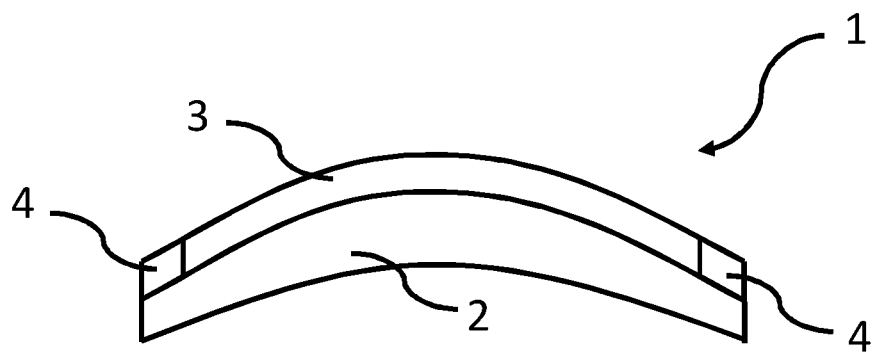

As shown on FIGS. 3 to 7, the heating component 4 may be in direct contact with the self-healing coating 3. FIG. 3 depicts an embodiment with the heating component 4 arranged in-between the substrate 2 and the self-healing coating 3. Alternately, FIG. 4 depicts an embodiment with the self-healing coating 3 extending over a first zone of a surface of the substrate, and the heating component 4 extending over a second zone of said surface of the substrate, the second zone being adjacent to the first zone.

For example, the heating component 4 may be glued to the substrate 2.

Advantageously, the direct contact between the heating component 4 and the self-healing coating 3 facilitates attaining and maintaining inside the self-healing coating 3 a uniform temperature adequate for repairing the self-healing coating 3.

Figure 5:
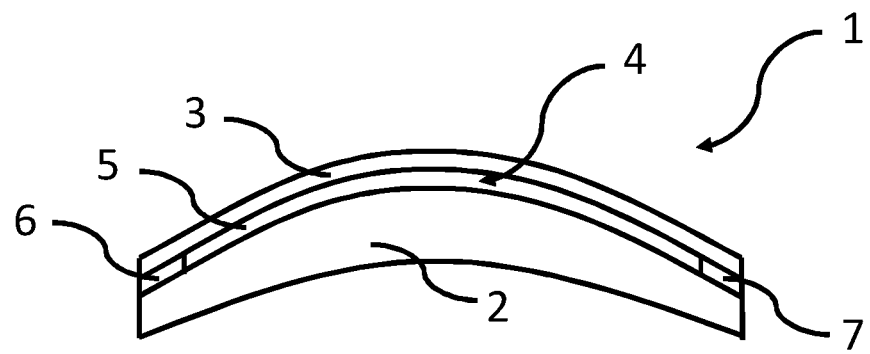

As shown on FIG. 5, the heating component 4 may comprise a resistive layer 5 and a pair of electrodes 6, 7 adapted to apply a current to the resistive layer 5 so that the resistive layer 5 heats up by Joule effect. The resistive layer 5 may be in thermal contact with the self-healing coating 3 so that the self-healing coating 3 may be heated up by the resistive layer 5 by conduction.

Advantageously, the optical lens 1 has standalone self-healing properties.

In embodiments, the heating component 4 may be arranged at least in part in a spectacle frame 8. In other words, at least part of the heating component 4 may be incorporated in a spectacle frame 8.

Figure 1:
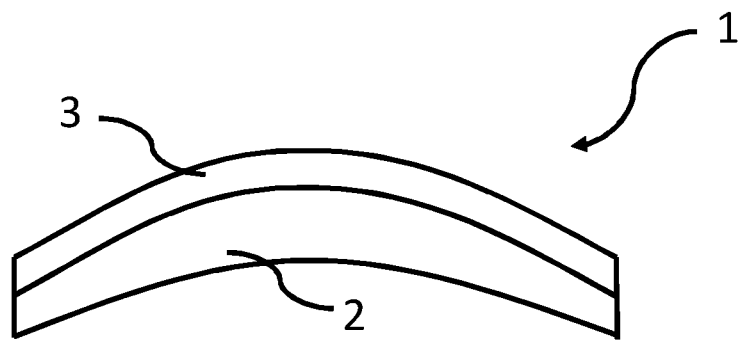
FIGS. 1 to 7 depict schematic cross-sectional views of an optical lens of an optical systems according to embodiments of the invention.

In embodiments, the entire heating component 4 may be arranged in a spectacle frame 8 as shown on FIG. 8, while the optical lens 1 may be a standard optical lens without a heating component 4, as shown on FIGS. 1 and 2.

As shown on FIG. 8, the heating component 4 may comprise a resistive material 9 adapted to transfer heat by thermal conduction to the self-healing coating 3 and a pair of electrodes 10, 11 adapted to apply a current to the resistive material 9 so that the resistive material 9 heats up by Joule effect.

Figure 9:
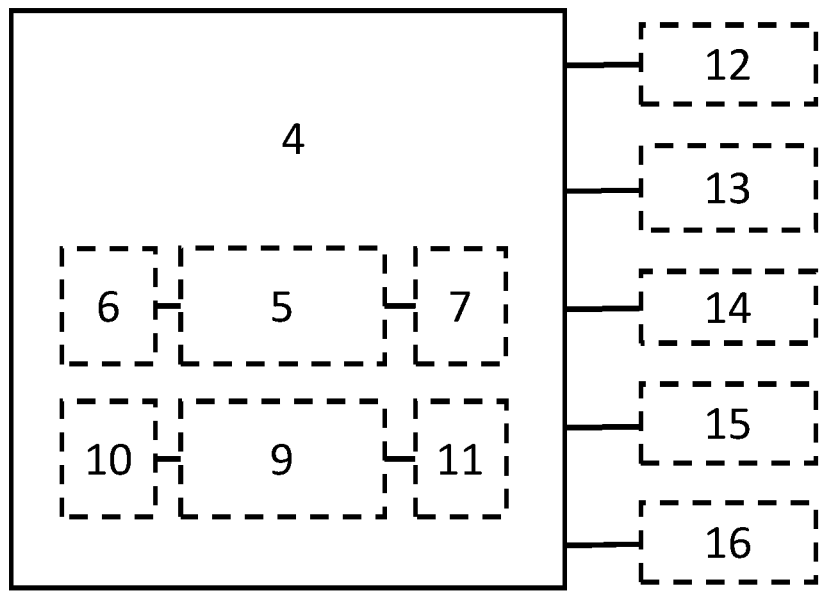
FIG. 9 depicts a functional diagram of a heating component of an optical system, and the means associated to said heating component, according to an embodiment of the invention.

As shown on FIGS. 8 and 9, the optical system may comprise a power supply 12 adapted to supply electrical power to the pair of electrodes 6, 7 adapted to apply a current to the resistive layer 5 or to the pair of electrodes 10, 11 adapted to apply a current to the resistive material 9. The power supply 12 may comprise any kind of electrical energy production device or electrical energy storage device, including, but not limited to, solar cells, disposable batteries or rechargeable batteries. In embodiments, the power supply 12 forms part of the heating component 4. The power supply 12 may be arranged in the spectacle frame 8. In embodiments, the power supply 12 may be removable or replaceable.

As shown on FIG. 9, the optical system may comprise activating means 13 and/or controlling means 14.

In the sense of the invention, activating means 13 are means adapted to activate the heating component 4, that is, to switch on the heating component 4 so that the heating component 4 starts heating the self-healing coating 3.

In the sense of the invention, controlling means 14 are means adapted to control the heating component 4, that is, to regulate the heat output of the heating component 4.

In embodiments, the activating means 13 and/or the controlling means 14 may be operated on demand by a person, such as the wearer of the optical system or an eye care professional. In embodiments, the activating means 13 or the controlling means 14 may be operated automatically according to one or more predefined triggers. A predefined trigger may for example be related to the power supply 12, such as the start of battery charging and/or related to data sensed by a sensor. In embodiments, the heating component 4 is inactivated most of the time to reduce electrical consumption. In embodiments, the heating component 4 is activated periodically, for example once a month.

Figure 6:
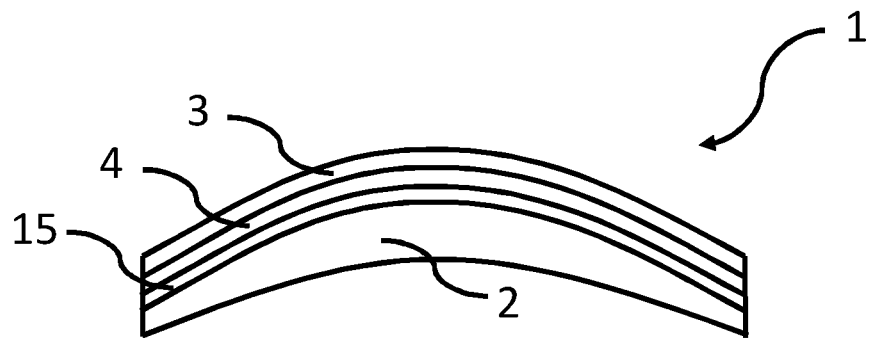

As shown on FIG. 6 and FIG. 9, the optical system may comprise an impact sensor 15.

The impact sensor 15 is adapted to detect the occurrence of a shock or impact on a surface of the optical lens 1. The impact sensor 15 may comprise an accelerometer to detect for example a fall of the optical system on the ground. The impact sensor 15 may comprise a vibration detector indicating a probability that a foreign object is contacting the optical lens 2. In embodiments, the impact sensor 15 may be operably connected to the activating means 13, so that if a shock or impact of sufficient force to damage the self-healing coating 3 of the optical lens 1 is detected by the impact sensor 15, the heating component 4 may be automatically activated by the activating means 13.

Advantageously, the optical lens 1 may be automatically repaired in case of damage sustained due to an impact or a shock.

Alternately, or in combination, the impact sensor 15 may be adapted to trigger a warning or an indication that an impact has occurred, and the heating component 4 may be subsequently activated manually and/or automatically.

The impact sensor 15 may form part of the optical lens 1. In embodiments as shown on FIG. 6, the impact sensor 15 forms a layer extending along at least part of the surface of the substrate.

Likewise, the optical system may comprise a force sensor, not represented on the figures, adapted to detect friction prone to form a scratch on the self-healing coating 3 or to abrade the self-healing coating 3. The force sensor may be operably connected to the activating means 13 so as to activate the heating component 4 when friction is detected.

Figure 7:
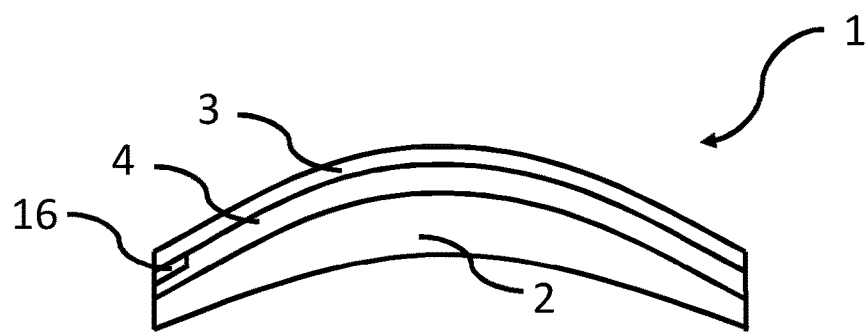

As shown on FIG. 7 and FIG. 9, the optical system may comprise a temperature sensor 16. The temperature sensor 16 is adapted to sense or determine the temperature in the self-healing coating 3. The temperature sensor 16 may for instance comprise a thermoresistance and/or a IR sensor, and/or a semiconductor sensor. The temperature sensor 16 may be part of the optical lens 1 and/or of a spectacle frame 8.

This allow to provide heating energy necessary to reach self healing, without damaging the lens via a monitoring of the lens temperature during heating phase, or via definition of the heating cycle that depend on ambient temperature, so that this cycle ensure once again that lens temperature is above temperature necessary for self healing, but under temperature damaging the lens.

Advantageously, the temperature of the self-healing coating may be accurately controlled thanks to the temperature sensor 16.

In embodiments, the temperature sensor 16 may be operably connected to the controlling means 14, so that the heat output of the heating component 4 may be regulated and the temperature in the self-healing coating 3 is maintained at or around a desired value greater than the glass-transition temperature of the self-healing coating 3.

The temperature sensor 16 may form part of the optical lens 1. In embodiments as shown on FIG. 7, the temperature sensor 16 extends along at least part of the surface of the self-healing coating 3.

The optical system may comprise storing means, such as a memory, to store a computer program carrying instructions for performing a method according to the invention for repairing the optical lens 1.

The optical system may comprise communication means, such as an antenna, to receive data from a sensor or to receive a computer program carrying instructions for performing a method according to the invention for repairing the optical lens 1.

Figure 10:
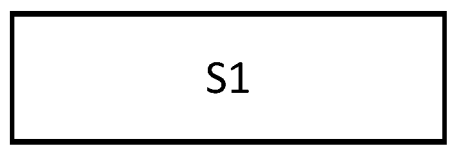
FIG. 10 depicts a method for repairing an optical lens of an optical system according to an embodiment of the invention.

As shown on FIG. 10, the invention further proposes a method for repairing an optical lens 1 of an optical system according to the invention, the method comprising:
  using (S1) the heating component 4 to heat the self-healing coating 3 at a temperature above the glass-transition temperature of the self-healing coating 3.

Advantageously, the method allows activating the self-healing properties of the self-healing coating 3.

Although representative processes and articles have been described in detail herein, those skilled in the art will recognize that various substitutions and modifications may be made without departing from the scope of what is described and defined by the appended claims. In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used. Any reference signs in the claims should not be construed as limiting the scope of the invention.

The invention claimed is:
1. An optical system comprising an optical lens, wherein:
  the optical lens comprises a substrate and a self-healing coating extending along at least part of a surface of the substrate, the self-healing coating having a glass-transition temperature equal to or greater than 40° C. and equal to or smaller than 60° C.;
  the optical system comprises a heating component adapted to heat the self-healing coating at a temperature above the glass-transition temperature of the self-healing coating;
  an impact sensor adapted to sense an impact on the optical lens; and an activator of the heating component, the activator being configured to activate the heating component when the impact sensor detects a shock on a surface of the optical lens.

2. The optical system of claim 1, further comprising a spectacle frame and said optical lens being mounted on the spectacle frame.

3. The optical system of claim 2, wherein the heating component is arranged in the spectacle frame.

4. The optical system of claim 1, wherein the heating component is arranged in the optical lens.

5. The optical system of claim 4, wherein the heating component is arranged in-between the substrate and the self-healing coating.

6. The optical system of claim 5, wherein the heating component comprises a resistive layer and a pair of electrodes adapted to apply a current to the resistive layer so that the resistive layer heats up by Joule effect.

7. The optical system of claim 1, wherein the heating component comprises a resistive material adapted to transfer heat by thermal conduction to the self-healing coating and a pair of electrodes adapted to apply a current to the resistive material so that the resistive material heats up by Joule effect.

8. The optical system of claim 1, further comprising a temperature sensor arranged to measure the temperature of the self-healing coating.

9. The optical system of claim 1, further comprising a controller of the heating component.

10. A method for repairing an optical lens of an optical system of claim 1, the method comprising:
using the heating component to heat the self-healing coating at a temperature above the glass-transition temperature of the self-healing coating.

* * * * *